INVENTORS
ANDREW STANYA
NORMAN A. HERRICK
BY
ATTORNEY

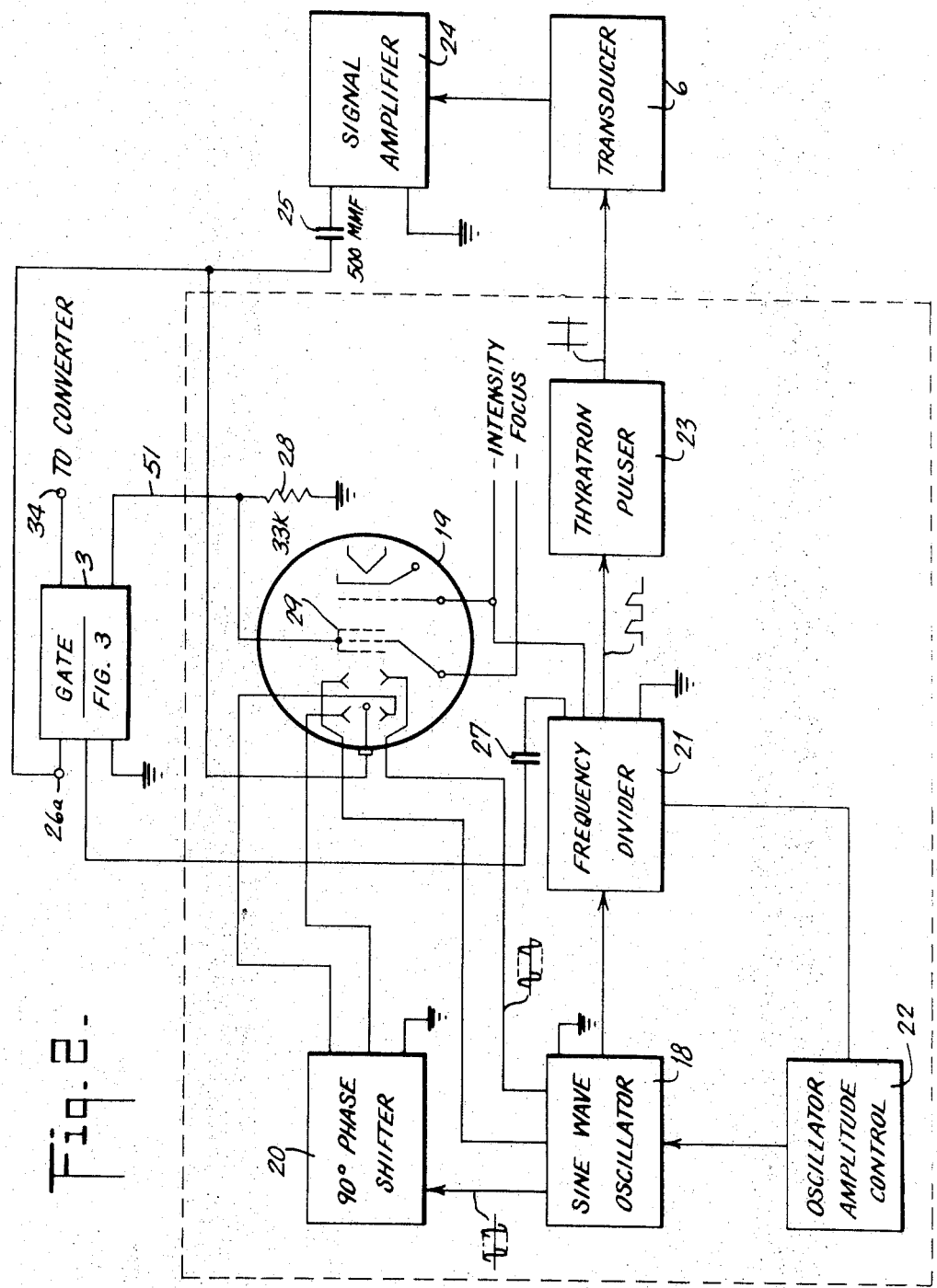

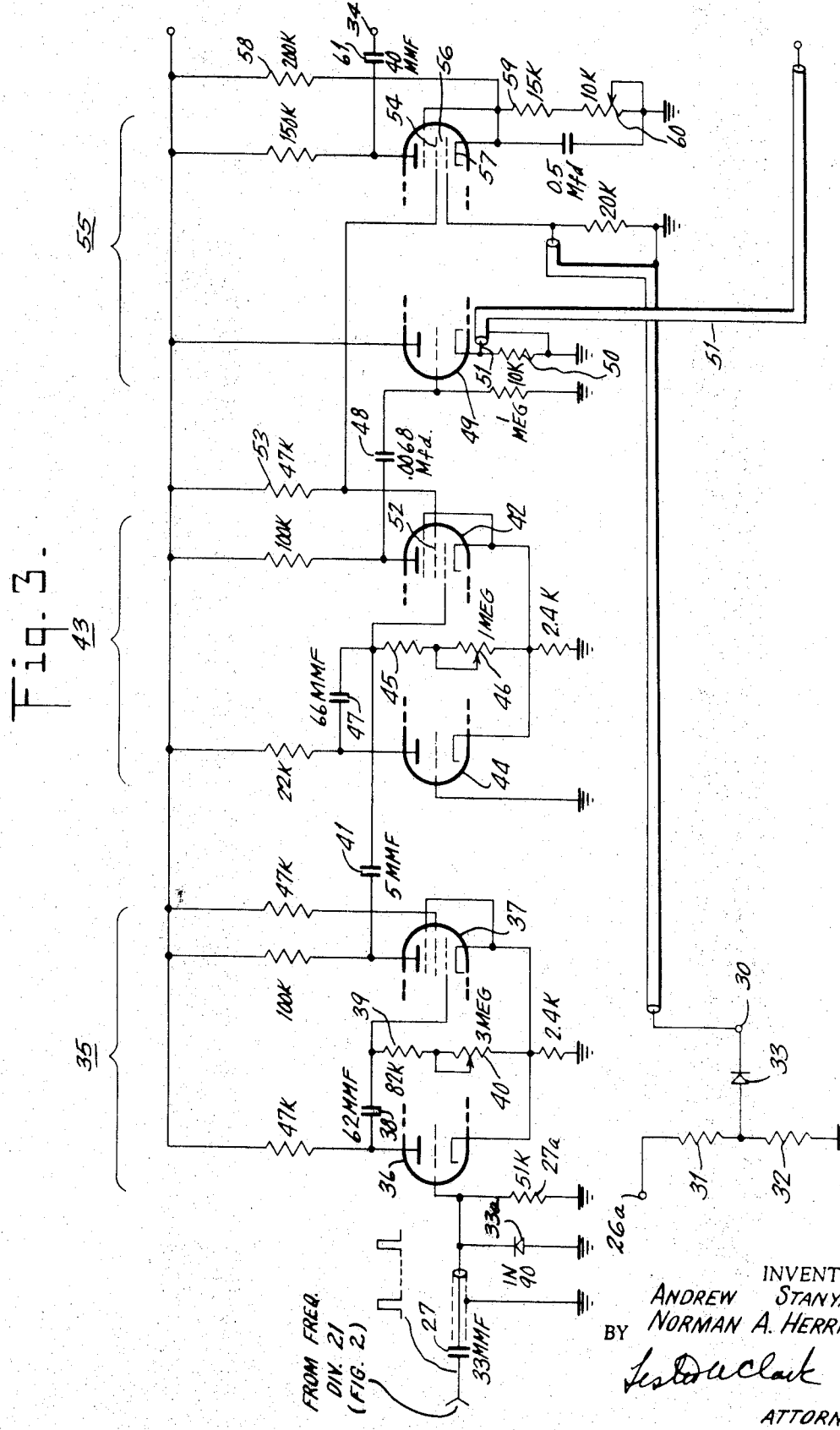

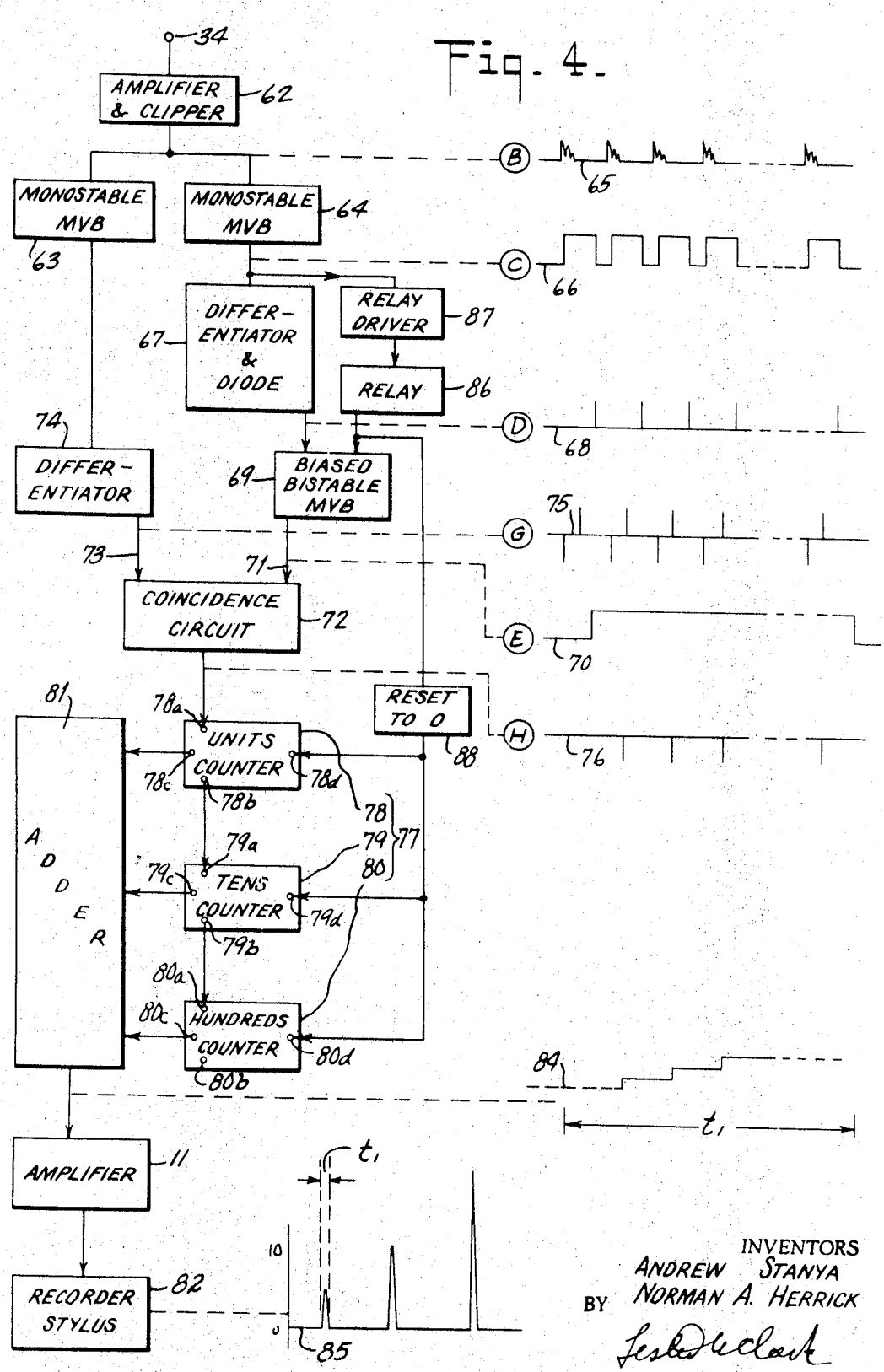

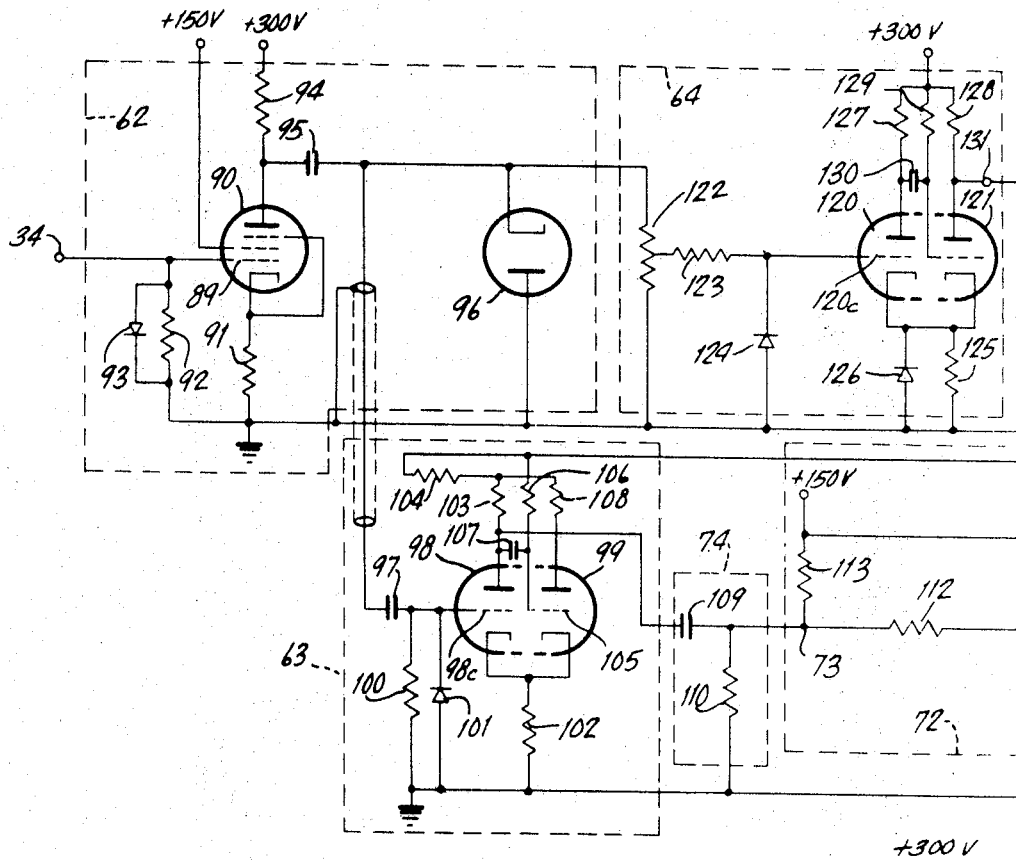
Fig. 5A.
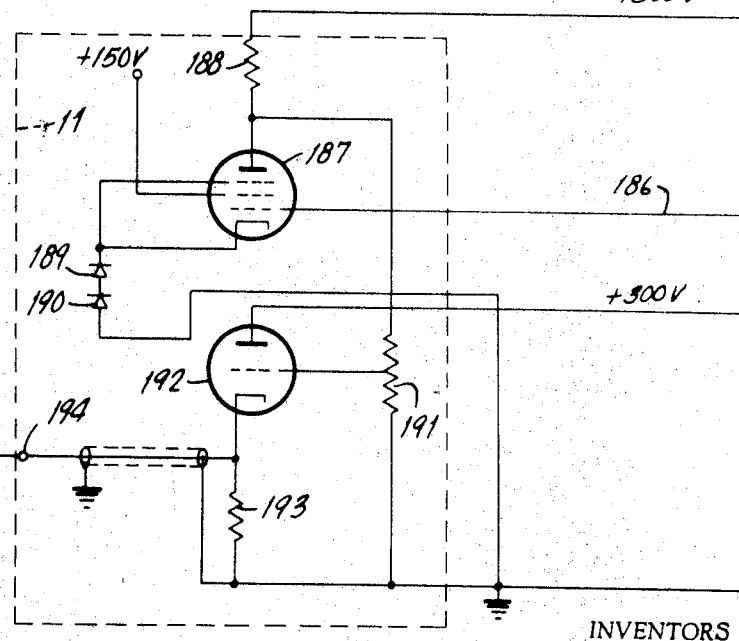
INVENTORS
ANDREW STANYA
NORMAN A. HERRICK
BY
Lester W Clark
ATTORNEY

United States Patent Office 3,533,099
Patented Oct. 6, 1970

3,533,099
PULSE COUNTER AND CONVERTER
Andrew Stanya, South Euclid, and Norman A. Herrick, Eastlake, Ohio, assignors to Republic Steel Corporation, Cleveland, Ohio, a corporation of New Jersey
Original application Apr. 8, 1963, Ser. No. 271,103. Divided and this application July 11, 1966, Ser. No. 574,525
Int. Cl. H03k 13/02
U.S. Cl. 340—347    8 Claims

ABSTRACT OF THE DISCLOSURE

A pulse counter and converter for counting pulses in a train, including a first monostable multivibrator to generate a standard pulse in response to each pulse in the train. The multivibrator output signal is differentiated and rectified, and triggers a bistable multivibrator which supplies an input to a coincidence circuit. The other input to the coincidence circuit is the differentiated output of a second monostable multivibrator which also generates a standard pulse from each pulse in the train. The bistable multivibrator is maintained in its ON condition by a relay driver and relay circuit, which receives signals from the first monostable multivibrator; the ON condition is maintained until a predetermined hiatus is detected in the pulse signals from the first monostable multivibrator. The coincidence circuit passes the differentiated signals from the second monostable multivibrator, of one polarity, to a counter circuit having a plurality of counter stages, one for each numerical order. Each counter stage includes an analog output which is connected to an adder to give an analog indication of the pulse count provided to the counter. Each counter stage resets itself when the number of pulses applied thereto equals the number of digits in the numerical order represented, and also triggers the next higher stage to accordingly increase its count.

The invention is set forth in the context of ultrasonic flaw detection, in which various gating techniques are employed to isolate signals representative of ultrasonic echo pulses from a flaw in a workpiece under inspection. The counter circuit referred to is employed to control a recording mechanism to provide a graphic indication of flaws.

CROSS REFERENCE TO RELATED APPLICATION

This application is a division of our application, Ser. No. 271,103, filed Apr. 8, 1963, for Sonic Testing Apparatus and Method, which has issued as Pat. No. 3,287,963 on Nov. 29, 1966 under the title Sonic Wave Pulse Echo Apparatus and Method for Measuring Flaw Dimension.

BRIEF SUMMARY OF THE INVENTION

This invention relates to pulse counting and converting. It is shown and described herein as applied to the counting of pulses from the ultrasonic testing of a longitudinal weld in a pipe, and the converting of the pulse signals to an analog signal representative of the pulse count, although it is applicable to pulse counting and converting generally. The invention involves providing a series of discrete uniform pulses corresponding to pulses in a train of electrical pulses wherein the pulses in the train may not be uniform. The invention also involves the conversion of the uniform pulses to an analog output.

An object of the invention is to provide improved pulse counting and converting apparatus.

BRIEF DESCRIPTION OF THE DRAWINGS

FIG. 2 is a block diagram of an ultrasonic pulse source and oscilloscope shown as a single block in FIG. 1;

FIG. 3 is a detailed wiring diagram of a gate shown as a single block in FIG. 2;

FIG. 4 is a block diagram of the counter and digital-to-analog converter shown as a single block in FIG. 1; and FIGS. 5A and 5B, taken together, constitute a detailed wiring diagram of the apparatus shown in block form in FIG. 4.

Referring now to FIG. 1, there is shown a motor 1 driving a lead screw 2 along which moves a carriage 4 supporting a pipe 5 which moves past a transducer schematically shown at 6. The motor 1 also drives, through a reduction gear 7, a recorder chart drive mechanism 8.

Figure 5B:
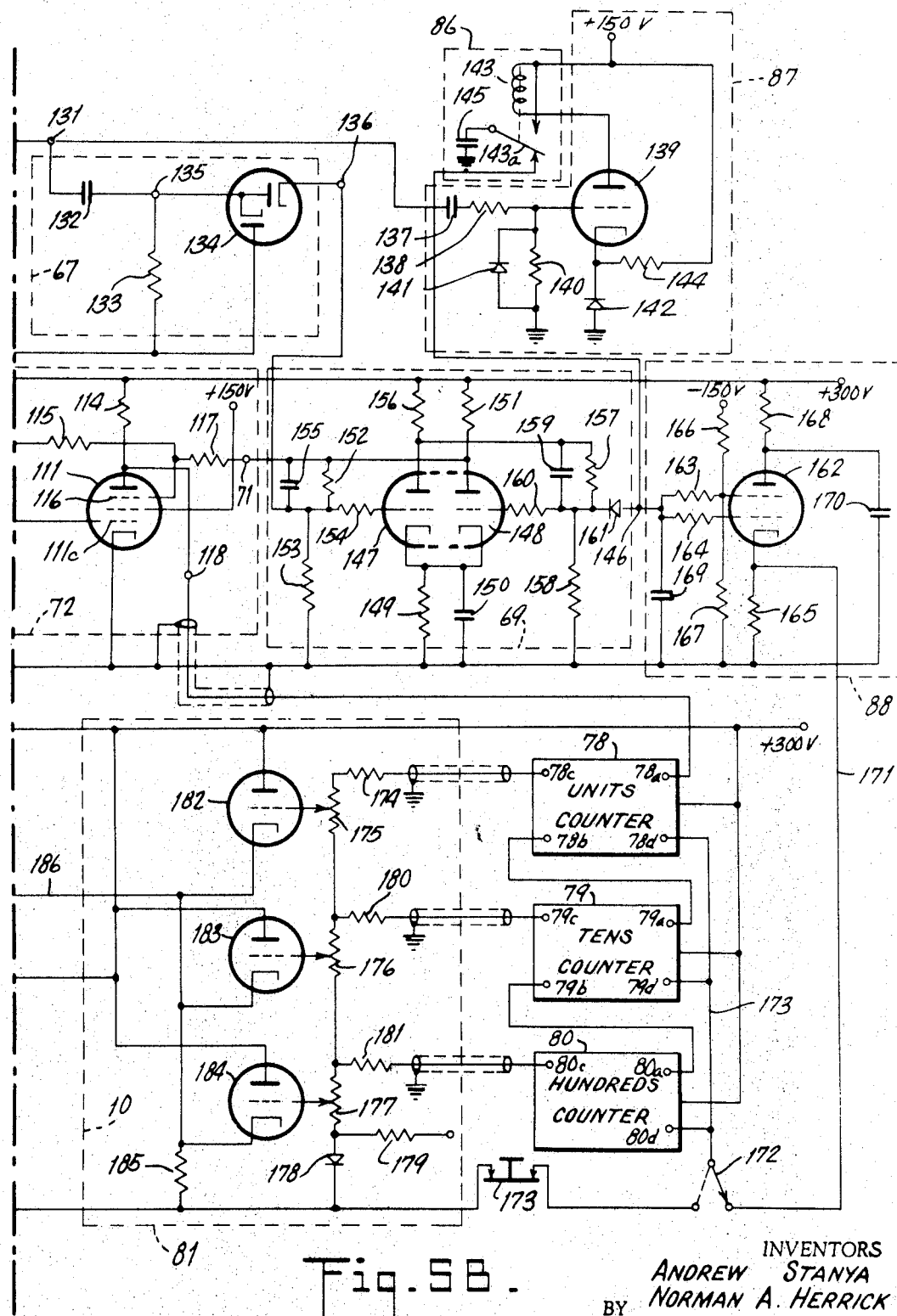

The transducer 6 receives energizing pulses from an ultrasonic pulse source and oscilloscope 9 shown in detail in FIG. 2. The pulse source 9 also controls a gate 3 (FIG. 3) which limits the passage of pulses received at the transducer 6 and flowing from that transducer to a counter and digital-to-analog converter indicated generally at 10. The output of the converter is connected through an amplifier 11 to a recorder stylus drive motor 82.

The graphical line 12 shows the energizing pulses supplied to the transducer 6. It may be noted that each pulse consists of several cycles of a predetermined frequency, usually in the ultrasonic range, and interrupted or pulsed at a much lower frequency, commonly 500 times per second.

Figure 1:
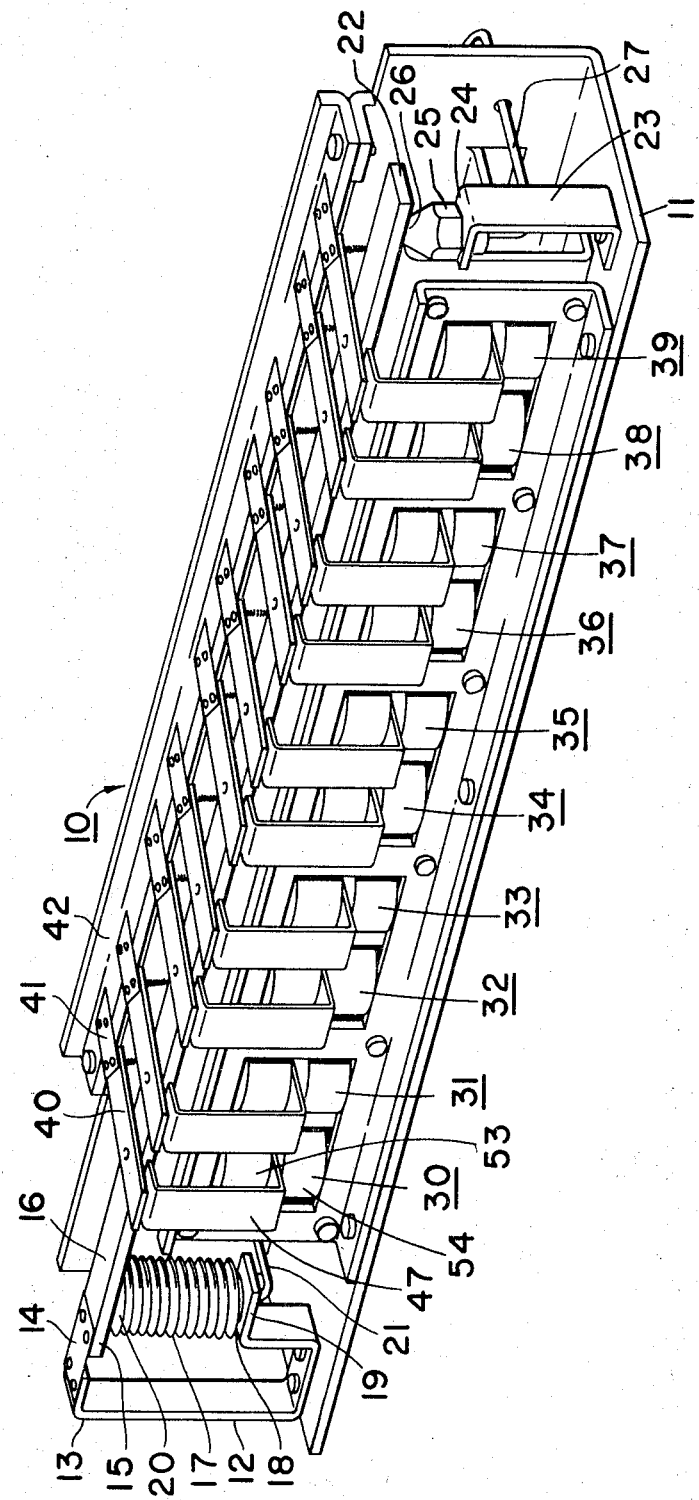
FIG. 1 is a block diagram of an apparatus embodying the invention, together with a graphical illustration of the waveforms encountered at certain points in the block diagram.

The line 13 in FIG. 1 shows the electrical wave form appearing at the output of transducer 6. This wave form includes the energizing pulses 12a from line 12, which are not blocked or filtered from the transducer output. (Commonly the same terminals are used for input and output of the transducer.) There also appear at the transducer output echo pulses 12b which may come from the side of the weld bead farthest from the transducer and echo pulses 12c, which may appear when a flaw exists between the transducer and the far side of the weld bead.

Line 14 shows a square wave signal generated internally by gate 3 in response to control signals supplied by the pulse source 9 to the control input of the gate 3. This square wave signal 14 has its pulses 14a spaced so as to exclude from the output of the gate 3 any pulses in the line 13 except those echo pulses 12c derived from the flaws in the workpiece. The line 15 shows the output of the gate 3 including only echo pulses originating with the workpiece flaws, and corresponding to the pulses 12c in line 12. The echo pulses in the line 15 are translated in the counter and converter 10 to the waveform shown in line 16 whose ordinate at any point is proportional to the count of the echo pulses since the last reset to zero. The potential represented by the line 16 is supplied from the output of converter 10 through amplifier 11 to the recorder stylus drive mechanism 82, so that the trace on the recorder chart 17 shows a series of peaks from a base line. The height of each peak shows the length of a corresponding flaw in the workpiece. The vertical scale on the chart 17 may be and preferably is substantially expanded with reference to the actual scale of the workpiece 6. In other words, six vertical inches on the chart may represent one inch on the length of the workpiece. On the other hand, the horizontal scale on the chart is compressed as compared to the scale of workpiece movement. For example, one inch in the horizontal direction on the chart may represent fifty inches of movement of the workpiece.

charges through a fixed resistor 39 and a manually adjustable resistor 40 serially connected across the input electrodes of the pentode tube section 37. The time constant of the capacitor 38 and resistors 39, 40 establishes the previously described delay between the application of an input pulse through the capacitor 27 and the generation of a gate pulse, and in practice may have a range of manual adjustment to maintain the pentode tube section 37 nonconductive over an interval of from about 20 microseconds minimum to 220 microseconds maximum thus to provide a maximum delay equivalent to a depth of approximately three feet in a metallic body to be inspected.

During the interval of nonconductivity of the pentode tube section 37 of the multivibrator stage 35, a positive pulse potential is developed in the output circuit of the pentode tube section. This potential pulse is applied through a relatively small coupling capacitor 41 to the control electrode of a normally fully conductive pentode tube section 42 of a second monostable multivibrator stage 43 also of conventional cathode coupled type and likewise utilizing a normally nonconductive triode tube section 44. A fixed resistor 45 and manually adjustable resistor 46 are serially connected between the input electrodes of the pentode tube section 42, and the value of the coupling capacitor 41 is so selected with relation to the values of the resistors 45 and 46 as to differentiate the potential pulse developed in the output circuit of the multivibrator stage 35. Thus a relatively short duration positive potential pulse is applied to the input electrodes of the pentode tube section 42 at the initiation of the output potential pulse of the multivibrator stage 35, but this positive applied pulse has no effect since the pentode tube section 42 is normally fully conductive. However, when the potential pulse developed in the output circuit of the multivibrator stage 35 terminates, the differentiation of this pulse causes a relatively sharp negative pulse to be applied to the input electrodes of the pentode tube section 42 to render the latter nonconductive. This causes the triode tube section 44 to be rendered fully conductive. By reason of the discharge of a coupling capacitor 47 through the resistors 45 and 46, the interval of nonconductivity of the pentode tube section 42 is controlled by the time constant of the capacitor 47 and resistors 45 and 46. The component values of this time constant circuit are so selected as to maintain the pentode tube section 42 nonconductive for an interval from approximately five microseconds minimum to approximately sixty-five microseconds maximum, which corresponds to a range of depths of approximately one foot in a metallic body to be inspected.

While the pentode tube section 42 is nonconductive, a positive potential pulse is developed in its anode circuit and is applied through a coupling capacitor 48 to a cathode follower stage 49 to develop across a cathode output resistor 50 the gate potential pulse earlier described and which is supplied through a shielded conductor 51 to the accelerating electrode 29 of the cathode ray tube 19 (FIG. 2) to produce the trace plateau.

The screen electrode 52 of the pentode tube section 42 of the multivibrator stage 43 develops a positive energizing potential through a resistor 53, which thus provides a second output circuit in which an even larger output pulse potential of this stage is developed. This pulse potential is applied to a control electrode 54 of a coincidence circuit 55. The echo pulse signals which are received from the signal amplifier 24 of FIG. 2 through the diode 33 are applied to a control electrode 56 of the coincidence circuit 55. The coincidence circuit 55 has its cathode 57 normally as positively biased by a potential divider, comprised by series resistors 58, 59 and 60 as shown, that the coincidence circuit 55 is normally nonconductive and does not translate the echo pulses applied to its control electrode 56 unless a gate potential pulse is simultaneonusly applied to its control electrode 54 from the second multivibrator stage 43. The resistor 60 is manually adjustable to effect selection of the minimum echo pulse amplitude which will render the coincidence circuit 55 conductive, thus effecting amplitude selection of echo pulses for translation to the output of the coincidence circuit.

Any echo pulses which are translated by the coincidence circuit 55 during an output gate potential pulse of the second multivibrator stage 43 are coupled through a capacitor 61 to output terminal 34 and thence to a counter and converter unit 10 shown as a single block in FIG. 1 and in greater detail in FIGS. 4 and 5.

FIG. 4

The echo pulses passed by the gate 3 to terminal 34 are transmitted through an amplifier 62 to the inputs of two monostable multivibrators shown diagrammatically in FIG. 4 at 63 and 64. The waveform appearing at the inputs of the multivibrators 63 and 64 is shown at 65 in FIG. 4, and is identical, except for differences in the scales, with the wave form shown in the line 15 of FIG. 1. The wave form at the output of the multivibrator 64 is shown by the line 66 and comprises a series of square waves whose leading edges are coincident with the leading edge of the first cycles in the pulses in line 65. The echo pulses in line 65 may vary considerably in form and duration depending upon the contour of the particular flaw being observed. The multivibrator 64 has the effect of translating each echo pulse into a square wave pulse of standardized form, as shown by line 66.

The output of multivibrator 64 is supplied to a differentiator and diode shown diagrammatically at 67, whose output consists of a series of single peak pulses, shown at 68 and coincident with the trailing edges of the square wave pulses in line 66. The output of the differentiator and diode 67 is supplied to one input of a biased bistable multivibrator 69. Any one of the pulses in line 68 is effective to switch the bistable multivibrator 69 from a first stable condition wherein its output potential is low, to a second stable condition wherein its output potential is high. The output potential of the bistable multivibrator 69 is shown in line 70. It may be noted that this potential switches from a low value to a high value at a time coincident with the first positive pulse in the line 68.

The bistable multivibrator 69 has a second input controlled by a relay 86. Energization of relay 86 is controlled by a relay driver circuit 87, whose input is in turn controlled by the signals at the output of monostable multivibrator 64. The output of the bistable multivibrator 69 is connected to one input 71 of a coincidence circuit 72. The coincidence circuit 72 has a second input 73 connected to the output of a differentiator 74, whose input is connected to the output of the monostable multivibrator 63. The monostable multivibrator 63 has a square wave output whose "on" time is substantially shorter than the "on" time of the square wave output of the multivibrator 64. The differentiator 74 converts these short square wave pulses into pairs of alternate negative and positive pulses, as shown at 75.

After the input 71 of the coincidence circuit 72 is switched to its high potential condition, then any negative pulses appearing at input 73 are passed through the coincidence circuit 72 and appear at its output, as shown at 76. The pulses at the output of the coincidence circuit 72 are supplied to a counter generally indicated at 77 and including a units counter 78; a tens counter 79 and a hundreds counter 80. Each of these counters may be pulse counters of a well known design, such as the frequency counters described in the book entitled "Principles of Electronic Instruments" by Gordon R. Partridge, published by Prentice Hall, Inc., in 1958, on pages 171 to 180. Such counters have a pulse input terminal, indicated respectively at 78a, 79a and 80a, a pulse output terminal indicated respectively at 78b, 79b and 80b and an analog output terminal 78c, 79c and 80c, at which potentials appear corresponding to the total number of pulses received at the respective input terminals. Each counter produces a carry pulse at its pulse output terminal when the total pulses in the counter exceed the counter capacity. The counters are also supplied with reset input terminals 78d, 79d and 80d. A reset pulse may be applied to these terminals by a reset circuit 88 controlled by relay 86, and is effective to reset all the counters to zero.

The analog output terminals 78c, 79c and 80c are connected to an adder 81 effective to produce an output potential which measures the total pulses registered in all three of the counters. The output of the adder 81 is supplied to the amplifier 11, whose output is in turn transmitted to the drive mechanism 82 for controlling the position of the stylus 17a of recorder 17.

The line 84 in FIG. 4 shows the variation in the output potential of the adder 81 in response to the counted pulses shown in the line 76. The line 85 in FIG. 4 represents on an enlarged scale, the trace appearing on the chart of recorder 17 in response to the potential shown in line 84. It should be observed that the scale for which line 85 is drawn is considerably shorter than the scale for which line 84 is drawn, as indicated by the different dimensions of the time $t_1$ indicated by the legends associated with those two lines.

FIGS. 5A and 5B

These two figures taken together illustrate the counter and digital-to-analog converter shown as a single block 10 in FIG. 1, and in block diagram form in FIG. 4, together with the recorder stylus drive amplifier 11, shown as a single block in both FIG. 1 and FIG. 4. Each block in FIG. 4 has a counterpart in FIGS. 5A and 5B marked with the same reference numeral.

The amplifier and clipper circuit 62 receives a pulse echo signal at input terminal 34 and applies it to a control electrode 89 of a pentode 90, which may be a 6U8-A tube, cathode biased by a resistor 91. A resistor 92 and a diode 93 are connected in parallel between the control electrode 89 and ground. The diode 93 is poled to pass the positive components of the input signal to ground, allowing only the negative components to reach the control electrode 89. A load resistor 94 is connected between the anode of the pentode 90 and the B supply, indicated as +300 volts. The pentode 90 amplifies and inverts the signal, the inverted signal appearing at the anode. The inverted signal is coupled through a capacitor 95 to the cathode of a diode 96, which shunts to ground any negative portion of the signal from the anode of the pentode 90, so that only the positive portions of that signal appear between the cathode of diode 96 and ground. These positive portions are coupled through a capacitor 97 to the input of monostable multivibrator 63. The multivibrator 63 includes a twin triode 98, 99 which may be a 12AU7. The capacitor 97 is connected to the control electrode 98c of triode 98. A resistor 100 and a parallel Zener diode 101 are connected between the control electrode 98c and ground. The Zener diode 101 is effective to short to ground any negative components of the signal appearing at control electrode 98c, and also shorts to ground any positive signal that exceeds its Zener voltage.

The triodes 98, 99 are cathode coupled to ground through a resistor 102. The anode of triode 98 is connected through resistors 103 and 104 to the B supply. The control electrode 105 of triode 99 is connected through a resistor 106 to the B supply and through a capacitor 107 to the anode of triode 98. The anode of triode 99 is connected to the B supply through a resistor 108 and resistor 104.

In the absence of an input signal, the connection of control electrode 105 to the B supply through resistor 106 is effective to bias it positively so that triode 99 conducts heavily, producing a sufficient drop across resistor 102 so that triode 98, whose control electrode 98c is at ground potential is cut off.

A positive signal appearing at the control electrode 98c causes current to flow through triode 98 and develop a potential drop across resistor 103, lowering the potential at the anode of triode 98. This drop in potential is transmitted through capacitor 107 to the control electrode 105, causing a reduction in the current flow through triode 99 and a corresponding reduction of the potential drop across resistor 102. The reduced voltage across resistor 102 permits more current to flow through triode 98 and hence a larger drop in potential to appear at the control electrode 105. The action is cumulative and continues until triode 99 stops conducting, which occurs even though the original signal terminates. During this process, capacitor 107 gradually becomes charged. As soon as triode 99 stops conducting, capacitor 107 starts to discharge through resistors 103, 104 and 106. The triode 98 remains conducting and the triode 99 nonconducting for a period of time depending upon the time required for capacitor 107 to discharge to a point where the switching process in the multivibrator starts to reverse itself. The reversing action, like the original switching action, is cumulative and rapidly switches the multivibrator back to its original condition with the triode 99 conducting and the triode 98 cut off. This condition is described as the OFF condition of the multivibrator, whereas the condition with triode 98 conducting and triode 99 cut off is described as the ON condition. The length of time that the multivibrator remains in the ON condition after receipt of a positive input signal is determined only by the circuit constants in the network associated with capacitor 107, and not by the amplitude or other characteristics of the input signal. The input signal need only be large enough to initiate the switching of the multivibrator from its OFF to its ON condition.

Consequently, in response to each input signal, the multivibrator 63 produces a square wave output signal of predetermined width. This signal is differentiated in the differentiator 74 comprising a capacitor 109 and a resistor 110, and is transmitted to input 73 of the coincidence circuit 72. The differentiated signal appears at 73 as a series of alternating negative and positive pulses, as shown at 75 in FIG. 4.

The coincidence circuit 72 includes a pentode 111. Control electrode 111c of pentode 111 is connected through a resistor 112 to input terminal 73. A resistor 113 is connected between input terminal 73 and a potential supply indicated in the drawing as being +150 volts. The resistor 110 is connected between input terminal 73 and ground. The resistors 113 and 110 are selected to form a voltage divider that provides a potential at the control electrode 111c sufficiently negative to hold the pentode 111 cut off in the absence of a positive input signal. The anode of pentode 111 is connected through a resistor 114 to the positive terminal of the B supply. The suppressor electrode 116 is connected through a resistor 115 to the positive terminal of the 150 volt supply. Suppressor electrode 116 is also connected through a resistor 117 to input terminal 71 of the coincidence circuit 72. Output terminal 118 of coincidence circuit 72 is connected to the anode of pentode 111. The characteristics of the coincidence circuit 72 are selected so that the pentode 111 can conduct only when positive signals appear both at the suppressor electrode 116 and at the control electrode 111c. Both of those electrodes are normally biased to negative potentials. As long as either one of them remains at its biased potential, it is effective to keep the pentode 111 non-conductive. In other words, a coincidence of positive signals at the pentode 111c and 116c is required to produce an output signal at terminal 118.

The monostable multivibrator 64 includes a twin triode 120, 121. The monostable multivibrator 64 is generally similar to the monostable multivibrator 63, except that its input signal is coupled through a resistor 122 having a slidable tap connected through a resistor 123 to the control electrode 120c so as to provide an adjustable control of the magnitude of an input signal which will trip the multivibrator 64 to its ON condition. The control electrode 120c of triode 120 is coupled to ground through a diode 124. The cathodes of the triodes 120 and 121 are connected together. A resistor 125 and a diode 126 are connected in parallel between the cathodes and ground. Resistors 127 and 128 respectively connect the anodes of the two triodes 120 and 121 to the B supply. A resistor 129 connects the control electrode of triode 121 to the B supply. A capacitor 130 couples the anode of triode 120 to the control electrode of triode 121. The anode of triode 121 is connected to an output terminal 131.

The output of multivibrator 64 is supplied to the differentiator and diode circuit 67 and also to the relay driver circuit 87. The differentiator and diode circuit includes a capacitor 132 and a resistor 133 connected in series between terminal 131 and ground. A twin diode 134 has one of its anodes and the other of its cathodes connected together and to the common terminal 135 of capacitor 132 and resistor 133. The other anode of the twin diode 134 is connected to ground and is effective to bypass to ground any negative components of the signal appearing at the common junction 135. The other cathode of the twin diode 134 is connected to an output terminal 136 and thence to one of the input terminals of the bistable multivibrator 69.

The output terminal 131 of multivibrator 64 is also connected to the relay driver stage 87 through a coupling capacitor 137 and a resistor 138 and thence to the control electrode of a triode 139. A resistor 140 and a diode 141 are connected in parallel between the control electrode of triode 139 and ground. A diode 142 is connected between the cathode of triode 139 and ground. The winding 143 of relay 86 is connected between the anode of triode 139 and a positive B supply indicated as +150 volts. A resistor 144 connects the positive B supply and the cathode of triode 139. Resistor 144 and resistor 140 are effective in the absence of an input signal to hold the triode 139 in a non-conductive condition. A positive signal appearing at the control electrode of triode 139 starts the flow of current through the triode and energizes the winding of relay 143, causing it to pick up its contact 143a, thereby completing a circuit for energizing a capacitor 145 from the 150 volt B supply. The relay 143 is selected to have a drop out time longer than the time between the output pulses of the multivibrator 64, as long as those pulses recur at the pulsing frequency. In most cases, it is desirable to make the drop out time of relay 86 longer than the period of several output pulses from the multivibrator 64.

When a train of input pulses terminates for a time longer than the drop out time of relay 143, the contact 143a drops and engages a back contact, thereby completing a circuit for the flow of the charge on capacitor 145 to a terminal 146 and thence to a second input terminal of the biased bistable multivibrator 69 and also to an input terminal of a reset circuit 88.

The bistable multivibrator 69 includes a twin triode 147, 148. The cathodes of the triodes 147 and 148 are connected together. A resistor 149 and a parallel capacitor 150 are connected between the cathodes and ground. Three resistors 151, 152 and 153 are connected in series between the B supply and ground. The common terminal of resistors 151 and 152 is connected to an anode of triode 148 and to the input terminal 71 of coincidence circuit 72. The common terminal of resistors 152 and 153 is connected through a resistor 154 to the control electrode of triode 147. A capacitor 155 is connected in parallel with resistor 152. Another set of three resistors 156, 157 and 158 provide a second voltage divider between the B supply and ground. A capacitor 159 is connected in parallel with resistor 157. The common terminal of resistors 156 and 157 is connected to the anode of triode 147. The common terminal of resistors 157 and 158 is connected through a resistor 160 to the control electrode of triode 148, and through an input coupling diode 161 to the terminal 146.

The two voltage dividers (151, 152, 153 and 156, 157, 158) are selected so that in the absence of an input signal the multivibrator 69 assumes a condition wherein triode 147 is cut off and triode 148 is conducting. The current flow through triode 148 is effective to establish a potential drop across resistor 151 which is transmitted through input terminal 71 to the suppressor electrode 116 of pentode 111 in the coincidence circuit 72 and maintains the output of the coincidence circuit cut off. Upon receipt of an input signal from the differentiator and diode 67, the bistable circuit 69 switches to its other stable condition wherein the triode 148 is cut off and triode 147 is conducting. The current flow through resistor 151 is then cut off and the suppressor electrode 116 is swung positively to allow the pentode 111 to become conductive in response to every positive input pulse thereafter applied to control electrode 111c. The bistable circuit 69 remains in this second stable condition until such time as the relay 143 drops out and the capacitor 145 discharges through terminal 146 to apply a positive impulse to the control electrode of triode 148, thereby switching the triode 148 to its conductive condition and restoring the bistable circuit to its original stable condition.

When pulses appear at output terminal 118 of coincidence circuit 72, they are transmitted to the input terminal 78a of the units counter circuit 78, mentioned above. The carry output terminal 78b of counter 78 is connected to the input terminal 79a of tens counter 79. The carry output terminal 79b of counter 79 is connected to the input terminal 80a of hundreds counter 80.

A reset circuit 88 receives input pulses from terminal 146. The reset circuit 88 includes a thyratron 162, which may be a type 2D21 and which has two control electrodes connected through resistors 163 and 164 to the terminal 146. The cathode of thyratron 162 is connected through a resistor 165 to ground. Two resistors 166 and 167 are connected between a source of bias potential indicated as −150 volts and ground. The common junction of resistors 166 and 167 is connected to that one of the two control electrodes which is connected to resistor 163. An anode load resistor 168 is provided for thyratron 162. A capacitor 169 is conected between terminal 146 and ground. Another capacitor 170 is connected between the anode of thyratron 162 and ground. The output potential of the reset circuit 88 is taken from the cathode of thyratron 162 and is supplied through a wire 171 and a switch 172 to a wire 173 connected to reset inputs 78d, 79d and 80d of the three counters. The switch 172 may be shifted from the full line position shown in the drawing to the dotted line position. In the full line position, the reset circuit 88 controls the resetting of the counters. In the dotted line position, the reset input terminals are connected to ground through a push button switch 173, which may be momentarily opened to disconnect the reset inputs from ground. The counter circuits are so constructed that such a disconnection is effective to reset them to their zero value.

The counter 78 has an analog output terminal 78c connected through a resistor 174 to a voltage divider including three variable resistors 175, 176, 177 and a Zener diode 178. The cathode of the diode 178 is grounded. Potential from a suitable source is supplied through a resistor 179 to the anode of diode 178. The analog output terminal 79c is connected through a resistor 180 to the common junction of the variable resistors 175 and 176. The analog output terminal 80c is connected through a resistor 181 to the common junction of variable resistors 176 and 177. The movable taps on the variable resistors 175, 176 and 177 are connected to the control electrodes of triodes 182, 183 and 184 respectively. The anodes of these three triodes are all connected to the B supply. The cathodes of the three diodes 182, 183 and 184 are connected together and to ground through a load resistor 185.

The voltage divider 175, 176 and 177 and the three triodes 182, 183 and 184 cooperate as an adder to produce across resistor 185 a potential drop proportional to the total amount registered in the counters 78, 79 and 80.

This output potential is taken through a wire 186 to the input of amplifier 11. The amplifier 11 includes a pentode 187 having a control electrode connected to wire 186. The anode of pentode 187 is connected to the B supply through a resistor 188. The cathode of pentode 187 is connected through two Zener diodes 189 and 190 in series to ground. The output potential from pentode 187 is taken from its anode through a resistor 191 having a movable tap connected to the control electrode of a triode 192. Triode 192 has its anode connected to the plate supply and its cathode connected through a load resistor 193 to ground. The cathode is also connected to an output terminal 194, which is in turn connected to the motor 82 driving the stylus 17a of recorder 17 (see FIG. 1) in a direction transverse to the direction of travel of the recorder chart.

Operation of FIGS. 5A–5B

When the transducer 6 receives a train of echo pulses indicating the presence of a flaw in the workpiece, that train of pulses is transmitted through the gate 3 to the counter and converter 10 and thence to the amplifier 11, where it is effective to supply to the stylus drive motor 82 a potential for moving the stylus transversely of the chart. As long as the train of echo pulses continues to be received without any interruption longer than the period determined by the drop out time relay 143, the stylus continues to move transversely to the chart (at least until the capacity of the counters 78, 79 and 80 is reached). Since the chart travels longitudinally over only a small distance during a substantial travel of the workpiece relative to the transducer, the dimension of any flaw in the direction of relative travel of the workpiece and transducer is amplified on the transverse scale of the chart and indicated there with substantial accuracy. While there are minor errors involved because of the fact that the first echo pulse in a train is not counted and also because the drop-out time of the relay is made long enough to bridge an interruption of several pulses in the train of echo pulses, these minor errors are of no importance. It is required to note the dimension of the flaw with sufficient accuracy so that the weld can be reworked to eliminate the flaw. The reworked length of the weld will necessarily extend long enough to overlap substantially any distance involved in such minor errors.

The accuracy of the measurement in any given installation of the invention depends upon: (1) the distance between the transducer head and the flaw which produces the echo; (2) the nature of the material being tested; and (3) the angle of the flaw with respect to the face of the transducer head. In practice, flaws have been measured with an accuracy of location of each end of the flaw of about one-eighth inch. In other words, flaws as small as one-eighth of an inch can be automatically measured and recorded.

The apparatus illustrated and described performs its best work for relatively short defects or flaws in the welds.

For example, the best measurements are made when the length of the flaw is approximately in a range where a registration on the hundreds counter 80 is produced. Where shorter flaws are encountered, their measurements can be made more accurately by disconnecting the hundreds counter and perhaps the tens counter also, and changing the calibration of the recorder by readjustment of the slidable taps on resistors 175 and 176, as required, to amplify the transverse movement of the stylus in response to the smaller counts. If it is desired to record the lengths of flaws above the capacity of the counters, then additional ordinal stages must be provided for the counter.

The following table illustrates values for the various resistors and capacitors and type numbers for the various tubes and diodes which were used in an embodiment of the invention that was successfully constructed and operated:

TABLE

Capacitor 25—500 mmf.
Capacitor 27—33 mmf.
Resistor 27a—51K
Resistor 28—3.3K
Resistor 31—100K
Resistor 32—47K
Diodes 33, 33a—Type 1N90
Tubes 36, 37—Type 6U8
Capacitor 38—62 mmf.
Resistor 39—82K
Resistor 40—3 meg.
Capacitor 41—5 mmf.
Tubes 42, 44—Type 6U8
Resistor 45—24K
Resistor 46—1 meg.
Capacitor 47—62 mmf.
Capacitor 48—0.068 mfd.
Tube 49—Type 6U8
Resistor 50—10K
Resistor 53—47K
Resistor 58—200K
Resistor 59—15K
Resistor 60—10K
Capacitor 61—40 mmf.
Resistor 91—300 ohms
Resistor 92—33K
Diode 93—Type 1N645
Resistor 94—10K
Capacitor 95—0.05 mfd.
Diode 96—½ 6AL5
Capacitor 97—250 mmf.
Tubes 98, 99—12AU7
Resistor 100—100K
Diode 101—1N753
Resistor 102—4.7K
Resistor 103—47K
Resistor 104—15K
Resistor 106—1 meg.
Resistor 108—47K
Capacitor 109—100 mmf.
Resistor 110—20K
Resistor 112—100K
Resistor 113—220K
Resistor 114—51K
Resistor 117—470K
Tubes 120, 121—12AT7
Resistor 122—0.5 meg.
Resistor 123—220K
Diode 124—1N645
Resistor 125—2K
Diode 126—1N756
Resistors 127, 128—47K
Resistor 129—10 meg.
Capacitor 130—0.1 mfd.
Capacitor 132—470 mmf.
Resistor 133—33K
Twin diode 134—6AL5
Capacitor 137—0.25 mfd.
Resistor 138—100K
Tube 139—6C4
Resistor 140—470K
Diode 141—1N645
Diode 142—1N759
Resistor 144—100K
Capacitor 145—0.05 mfd.
Tubes 147, 148—12AT7
Resistor 149—15K
Capacitor 150—0.005 mfd.
Resistor 151—47K

TABLE—Continued

Resistor 152—390K
Resistor 153—200K
Resistor 154—100 ohms
Capacitor 155—100 mmf.
Resistor 156—47K
Resistor 157—390K
Resistor 158—200K
Capacitor 159—100 mmf.
Resistor 160—100K
Diode 161—1N645
Tube 162—2D21
Resistor 163—68K
Resistor 164—6.8K
Resistor 165—270 ohms
Resistor 166—330K
Resistor 167—6.8K
Resistor 168—330K
Capacitor 169—0.02 mfd.
Capacitor 170—0.01 mfd.
Resistor 174—8.2 meg.
Resistor 175—10K
Resistor 176—100K
Resistor 177—1 meg.
Diode 178—1N751
Resistor 179—75K
Resistor 180—8.2 meg.
Resistor 181—8.2 meg.
Tubes 182, 183, 184—½ 12AU7
Resistor 185—1K
Tube 187—5879
Resistor 188—30K
Diodes 189, 190—1N756
Resistor 191—1 meg.
Tube 192—½ 12AU7
Resistor 193—20K While we have shown and described a preferred embodiment of our invention, other modifications thereof will occur to those skilled in the art, and we therefore intend our invention to be limited only by the appended claims.

What is claimed is:

1. Apparatus for counting the pulses in a train of electrical waves of predetermined frequency pulsed at a lower frequency, comprising:
   (a) a monostable multivibrator having an input connected to receive said train and effective in response to the leading edge of each pulse in the train; to switch from its stable state to its unstable state and to remain in the unstable state for a time longer than the pulse duration so as to generate an output pulse of a duration longer than the duration of the pulse applied to the monostable multivibrator;
   (b) means to differentiate the output pulses from the monostable multivibrator; and
   (c) means to count the pulses from the differentiating means.

2. Apparatus for counting the pulses in a train of electrical waves of predetermined frequency pulsed at a lower frequency, comprising:
   (a) a first pulse generator having an input connected to receive said train and effective in response to each pulse in the train to generate a first pulse of standard amplitude and duration;
   (b) first differentiating means for differentiating the first standard pulses generated by the first pulse generator, said first differentiating means including diode means for passing only those differentiated pulses of the same polarity;
   (c) a second pulse generator responsive to a pulse passed by said diode means for generating a second pulse signal;
   (d) hiatus detection means having an input connected to receive said first standard pulses and controlling said second pulse generator so that said second pulse generator continues to generate said second pulse signal until a predetermined hiatus is detected in the first standard pulses;
   (e) a third pulse generator having an input connected to receive said train and effective in response to each pulse in the train to generate a third pulse of standard amplitude and duration;
   (f) second differentiating means for differentiating the third standard pulses generated by said third pulse generator; and
   (g) a coincidence circuit supplied with the output of said second differentiating means and said second pulse generator for producing at an output thereof a series of pulses corresponding to the pulses generated by said second differentiating means during the period of generation of said second pulse signal by said second pulse generator.

3. Apparatus as defined in claim 2, wherein the first and third pulse generators generate pulses each of which is of a duration less than the time elapsing between consecutive pulses in the train, the pulses generated by the first pulse generator being longer in duration than the pulses generated by the third pulse generator, each pulse generated by the first and third pulse generators commencing in response to the leading edge of a pulse in the train.

4. Apparatus as defined in claim 2, wherein said first and third pulse generators comprise monostable multivibrators, and wherein said second pulse generator comprises a bistable multivibrator.

5. Apparatus as defined in claim 4, wherein said hiatus detection means comprises a relay driver energized by the monostable multivibrator constituting said first pulse generator, and a relay circuit controlled by said relay driver.

6. Apparatus as defined in claim 2, including:
   (a) a plurality of counter stages, one for each of a plurality of numerical orders, each counter stage comprising:
      (1) an input for receiving pulses from said coincidence circuit;
      (2) an analog output for supplying a potential varying in accordance with the number of pulses received;
      (3) a pulse output for supplying a pulse each time the number of pulses equals the number of digits in the numerical order;
      (4) means for resetting the analog output to zero each time a pulse is produced at the pulse output;
   (b) means connecting the pulse output of each stage to the input of the stage of next higher order; and
   (c) adder means connected to the analog outputs of all the stages for producing a potential varying with the sum of the potentials at said analog outputs.

7. Apparatus as defined in claim 6, wherein said hiatus detection means controls said counter stages to reset said counter stages upon the detection of said predetermined hiatus in the first standard pulses.

8. Apparatus for counting a train of input pulses, comprising:
   (a) monostable multivibrator means receiving said input pulses for generating a first output pulse signal each pulse of which corresponds to an individual input pulse received by the monostable multivibrator means;
   (b) differentiating means coupled to said monostable multivibrator means for differentiating the first output pulse signal and generating a second output pulse signal each pulse of which corresponds to an individual pulse in the first output pulse signal;
   (c) pulse counting means coupled to said differentiating means for counting the pulses in the second output pulse signal; and (d) means receiving said input pulses and coupled to said pulse counting means and responsive to a predetermined hiatus in the train of pulses to reset the pulse counting means.

References Cited
UNITED STATES PATENTS

| | | | |
|---|---|---|---|
| 2,793,360 | 5/1957 | Beaumont | 340—347 |
| 2,839,744 | 6/1958 | Slocomb | 340—347 |
| 3,064,191 | 11/1962 | Dever et al. | 324—99 |
| 3,135,947 | 6/1964 | Grondin et al. | 340—172.5 |
| 3,213,677 | 10/1965 | Maklary | 73—67.9 |
| 3,237,186 | 2/1966 | Whelpley et al. | 340—347 |
| 3,274,586 | 9/1966 | Lapinski | 340—347 |
| 3,316,751 | 5/1967 | Burk | 73—23.1 |
| 3,247,486 | 4/1966 | Choisser et al. | 328—48 |
| 3,040,185 | 6/1962 | Horton. | |
| 2,757,862 | 8/1956 | Boyden et al. | 235—60.4 |
| 3,237,188 | 2/1966 | Shair et al. | 340—347 |
| 3,261,012 | 7/1966 | Bentley | 340—347 |

MAYNARD R. WILBUR, Primary Examiner

J. GLASSMAN, Assistant Examiner

U.S. Cl. X.R.

235—92; 328—48

INVENTOR.
EVERETT O. OLSEN
BY David E. Hopper
ATTORNEY